(12) United States Patent
Huber, Jr. et al.

(10) Patent No.: US 6,431,329 B1
(45) Date of Patent: Aug. 13, 2002

(54) FLUID PARKING BRAKE FOR A RAIL VEHICLE AIR BRAKE CYLINDER

(75) Inventors: Howard E. Huber, Jr., Black River; Robert L. Neulieb, Theresa, both of NY (US)

(73) Assignee: New York Air Brake Corporation, Watertown, NY (US)

( * ) Notice: Subject to any disclaimer, the term of this patent is extended or adjusted under 35 U.S.C. 154(b) by 0 days.

(21) Appl. No.: 09/661,565

(22) Filed: Sep. 14, 2000

(51) Int. Cl.⁷ ................................................ B61H 13/00
(52) U.S. Cl. ..................... 188/33; 188/196 D
(58) Field of Search ................... 188/33, 265, 153 R, 188/202, 196 V, 196 P, 197, 198, 199, 196 D; 92/13.8

(56) References Cited

U.S. PATENT DOCUMENTS

| | | |
|---|---|---|
| 3,944,286 A | 3/1976 | Engle et al. |
| 4,019,426 A | 4/1977 | Wosegien et al. |
| 4,201,277 A | 5/1980 | Meier et al. |
| 4,215,767 A | 8/1980 | Shirey |
| 4,385,548 A * | 5/1983 | Persson et al. ..... 188/196 D X |
| 4,493,246 A * | 1/1985 | Dalibout ...................... 92/13.8 |
| 4,733,602 A | 3/1988 | Smith et al. |
| 4,840,257 A * | 6/1989 | Harrison ................. 188/196 D |
| 4,921,076 A | 5/1990 | Grenier et al. |
| 5,495,921 A * | 3/1996 | Samulak et al. ............ 188/202 |
| 5,701,974 A | 12/1997 | Kanjo et al. |
| 5,701,975 A | 12/1997 | Hawryszkow |
| 6,186,284 B1 | 2/2001 | Sauter et al. |
| 6,279,689 B1 | 8/2001 | Zemyan |

* cited by examiner

*Primary Examiner*—Paul N. Dickson
*Assistant Examiner*—Melanie Torres
(74) *Attorney, Agent, or Firm*—Barnes & Thornburg

(57) ABSTRACT

A fluid parking brake for a rail vehicle having a brake cylinder with a first piston responsive to fluid signals to apply and release the brakes on the vehicle. The parking brake includes a housing having a second piston in the housing and which is coupled to the first piston. An apply port in the housing receives a pressure signal to move the second piston to an apply position. A locking clutch is provided for locking the second piston in the applied position.

27 Claims, 8 Drawing Sheets

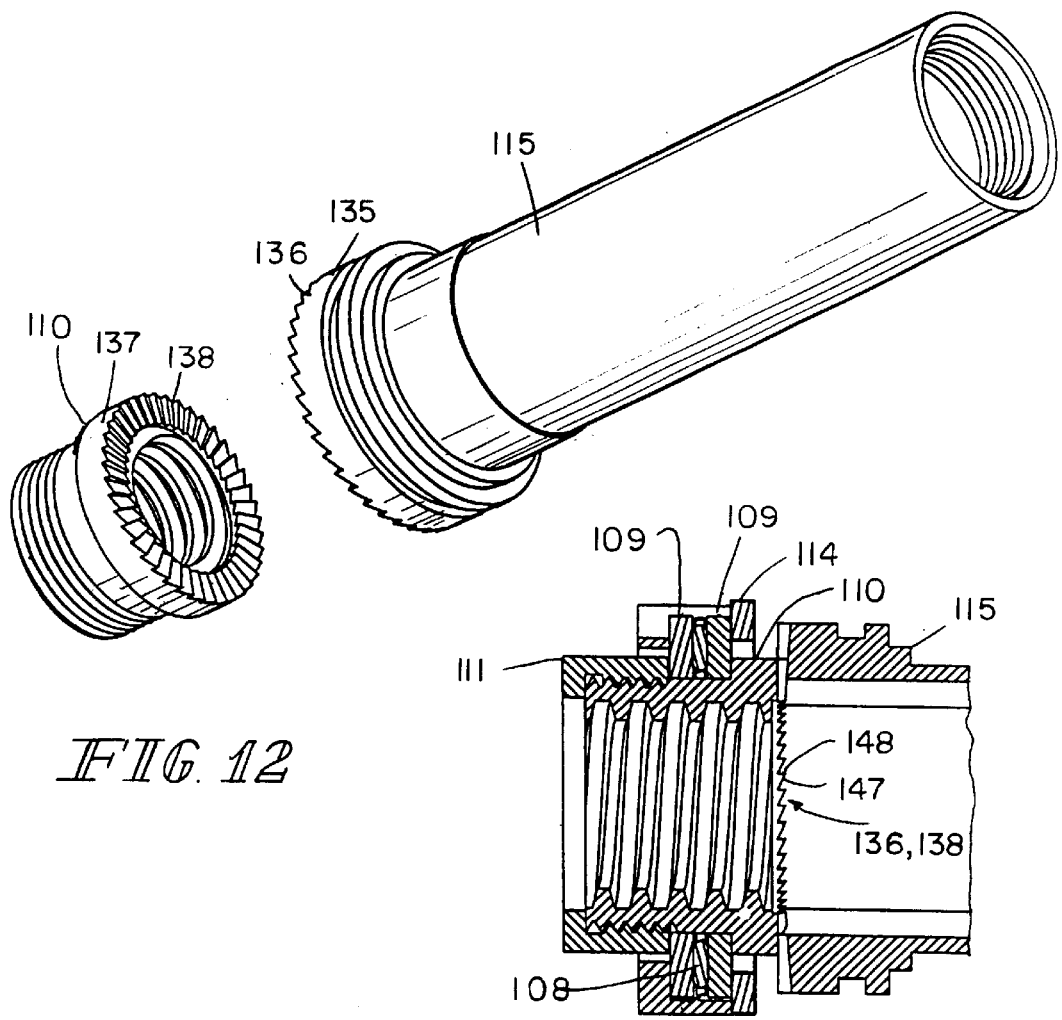
*FIG. 12*
*FIG. 13*
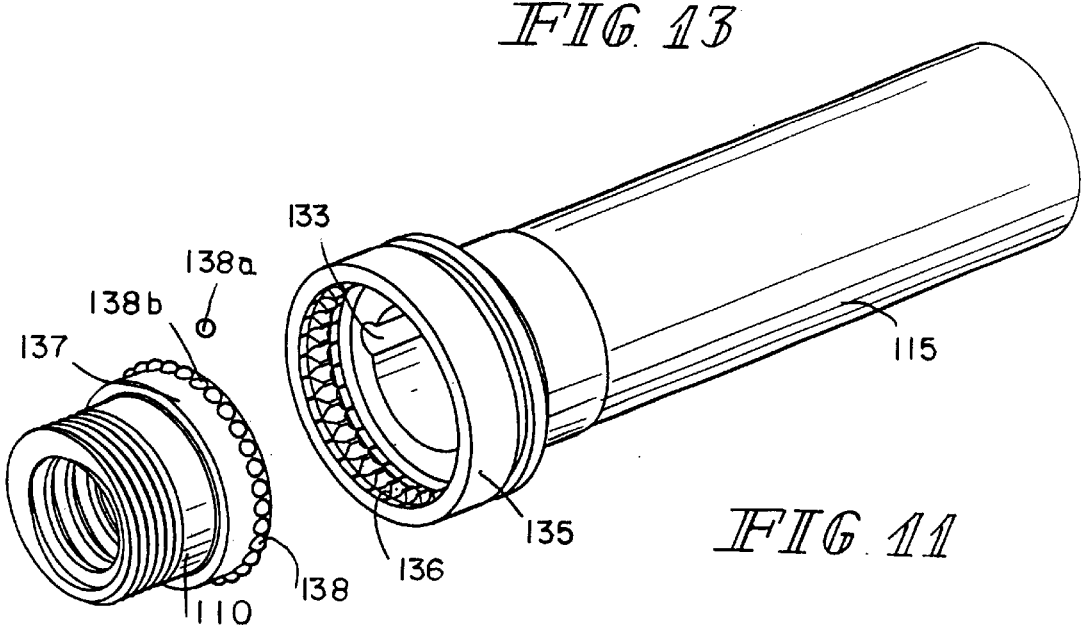
*FIG. 11*

FLUID PARKING BRAKE FOR A RAIL VEHICLE AIR BRAKE CYLINDER

BACKGROUND AND SUMMARY OF THE INVENTION

The present invention relates generally to rail vehicle air brakes and more specifically, to a fluid operated parking brake therefore.

The brakes for railroad vehicles are pneumatic operated brakes, or air brakes which include a brake cylinder to operate the brake shoes to engage the wheel and brake the car. The brake cylinder receives a pneumatic signal to apply the brakes and generally has a spring return. Other brake cylinders may be spring applied and air released. Most railroad cars also include a parking or hand brake, which is a manually operated device which applies the brake manually. For truck mounted brake riggings, the hand brake is generally applied to the output of the brake cylinder and more specifically to the levers which connect the brake cylinder to the brake beams. A typical example is shown in U.S. Pat. No. 5,069,312. Chains are generally connected to the levers and to a convenient place on the car to allow the manual application of the parking brake. Another example of a truck mounted brake includes brake cables which are actuated manually and remotely and are connected to the piston of the brake cylinder to manually operate the brake cylinder. A typical example is shown in U.S. Pat. No. 4,653,812 and similarly illustrated in FIGS. 1 and 2 to be assessed below. Another mechanical system for a hand brake at the output of the brake cylinder is illustrated in U.S. Pat. No. 4,019,426.

The integration of the air brake control of the brake cylinder and a manual, pneumatic and/or electropneumatic controlled parking brake is illustrated in U.S. Pat. No. 5,738,416. In one embodiment illustrated in FIGS. 7 and 8, the piston rod of the modified brake cylinder includes a recess to receive a latching detent controlled by a piston rod of a latching cylinder. This mechanism latches the brake in the applied position and requires a release signal to remove the detent. Thus, in even normal braking conditions, the detent is actuated.

Manual pumps to actuate separate hydraulic parking brakes on railroad vehicles are illustrated in U.S. Pat. No. 5,701,975. The parking brakes are connected to the brake beams and are independent of the normal brake cylinder.

The present invention is a fluid parking brake for a rail vehicle having a brake cylinder with a first piston responsive to fluid signals to apply and release the brakes on the vehicle. The parking brake includes a housing having a second piston in the housing and which is coupled to the first piston. An apply port in the housing receives a pressure signal to move the second piston to an apply position. A locking clutch is provided for locking the second piston at least in the applied position.

The locking clutch may have a first clutch surface carried by the housing and a second clutch surface carried by the second piston. The first and second clutch surfaces are concentric when engaged to lock the second piston and move relative to each other in either direction to disengage and unlock the second piston. The first and second clutch surfaces move relative to each other in a first direction to disengage when the second piston is in the applied position and move relative to each other in a second direction opposite the first direction to disengage when the second piston is in a released position.

The locking clutch may have a first clutch surface carried by the housing and a second clutch surface carried by the second piston. The first and second clutch surfaces are concentric when engaged to lock the second piston and move relative to each other in either directions to disengage and unlock the second piston. The first and second clutch surfaces move relative to each other in a first direction to disengage when the second piston is in the applied position and move relative to each other in a second direction opposite the first direction to disengage when the second piston is in a released position.

The first clutch surface may be on a nut threadably received on the second piston and the second clutch surface may be on a sleeve rotationally fixed to the second piston. The sleeve moves axially on the second piston. The second piston and the sleeve include opposed axial grooves and a pin in the grooves rotationally fixing the sleeve to the second piston and allowing axial movement between the sleeve and the second piston. A thrust bearing is between the nut and the housing. A spring is between the sleeve and the housing. The second piston is coupled to the first piston by a lost motion device.

Other objects, advantages and novel features of the present invention will become apparent from the following detailed description of the invention when considered in conjunction with the accompanying drawings.

BRIEF DESCRIPTION OF THE DRAWINGS

FIG. 11 is a perspective view of a second embodiment of the nut and sleeve of a third embodiment of the locking clutch.

FIG. 12 is a perspective view of a nut and sleeve of a third embodiment of the locking clutch.

FIG. 13 is a cross sectional view of the third embodiment of the locking clutch in the locked position.

DETAILED DESCRIPTION OF THE PREFERRED EMBODIMENTS

Figure 1:
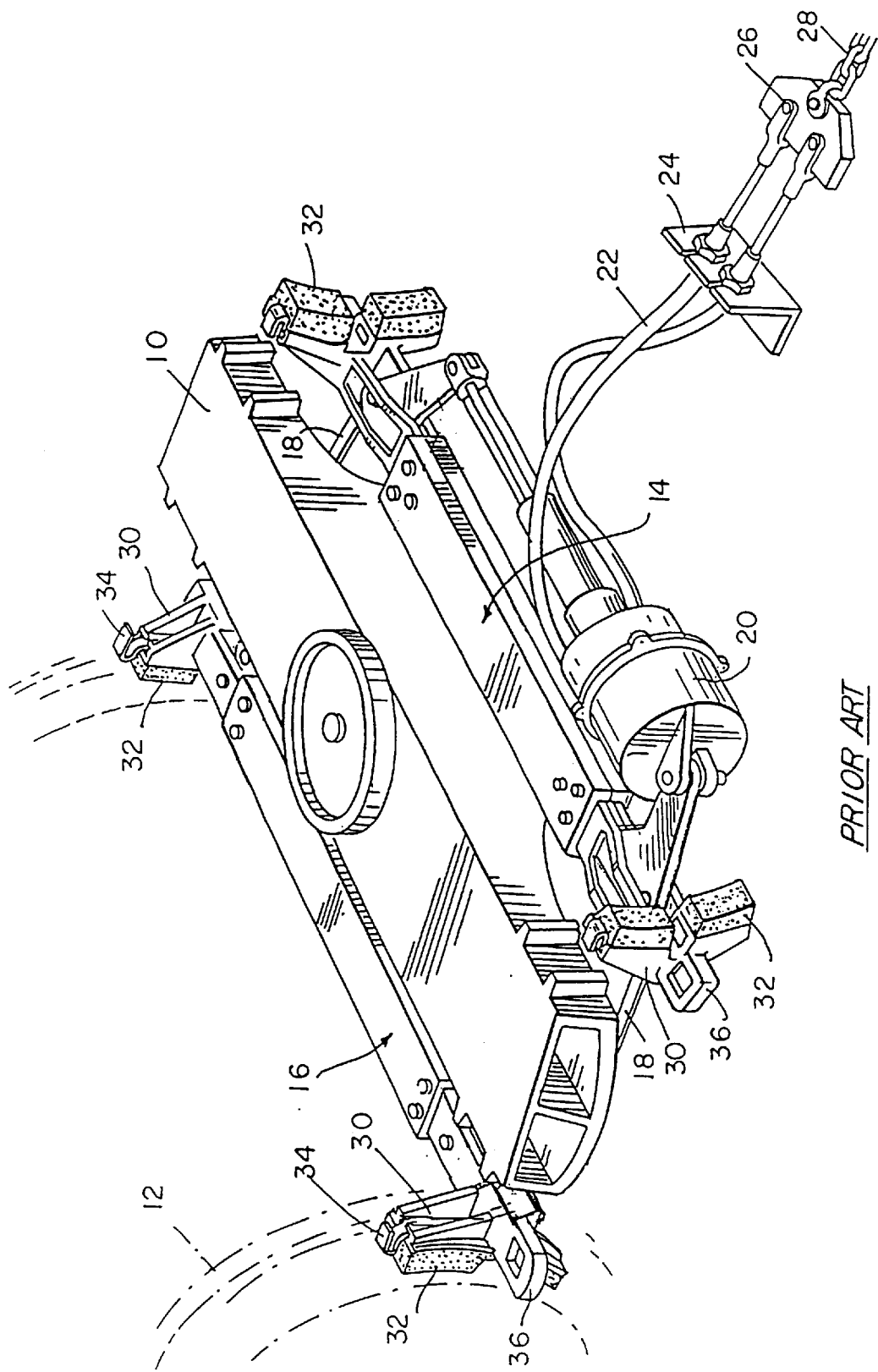
FIG. 1 is prior art showing a perspective view of a truck mounted brake mounted to a truck.

A truck mounted brake is shown in FIG. 1 with respect to bolster 10 of the truck and a wheel 12. The illustration is for a double axle truck and therefore will be described with respect to two brake beams. It should be noted that the system may also be used with a single axle and therefore a single brake beam.

Figure 2:
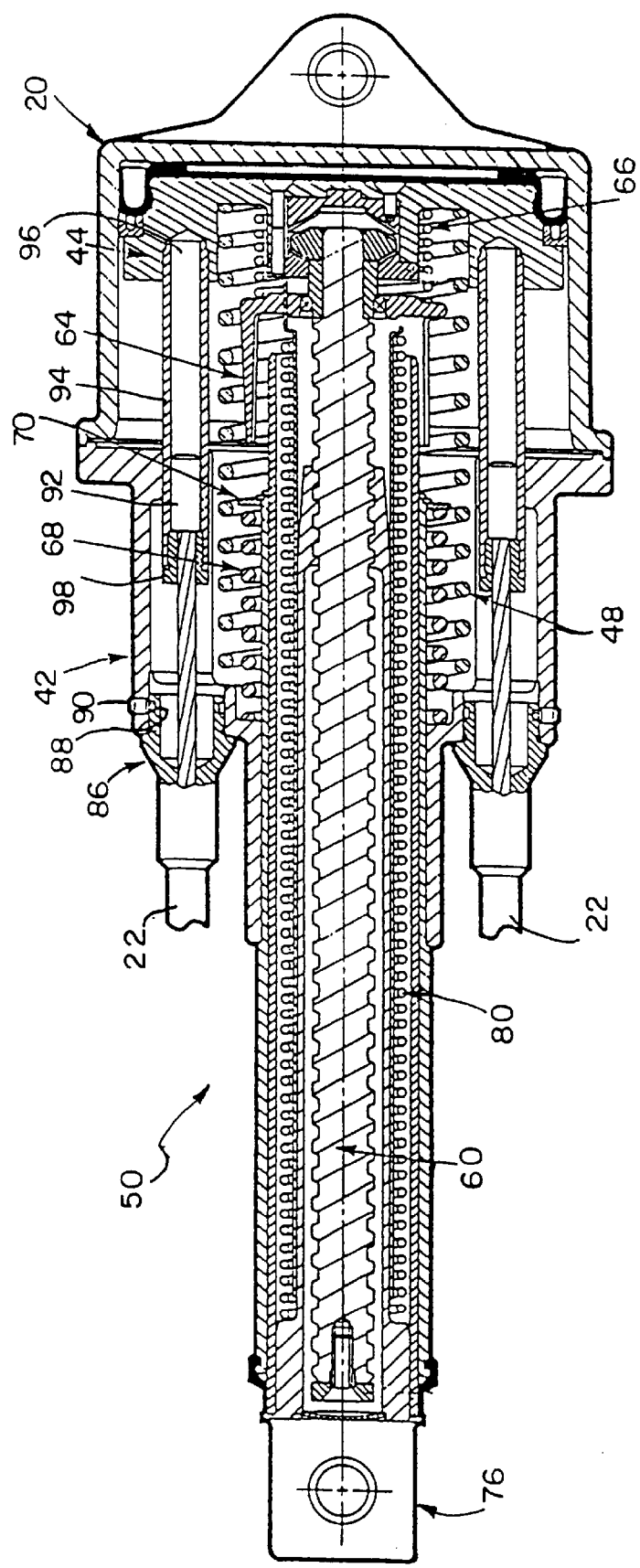
FIG. 2 is a cross sectional view of the brake cylinder actuator with slack adjuster of the prior art of FIG. 1.

The truck mounted brake illustrated in FIGS. 1 and 2 include a primary brake beam 14 and a secondary brake beam 16 on opposite sides of the bolster 12 and interconnected by force transmission or push rod assembly 18. An actuator 20 is supported by the primary beam 14 and is connected to the secondary beam 16 by the push rods 18. A hand brake cable 22 is connected to the actuator 20 and to cable reaction bracket 24, equalization plate 26 and chain 28.

At each end of the primary beam 14 and the secondary beam 16, is a brake head 30 having brake shoes 32 secured thereto by removable latch 34. Also, extending from the ends of each of the brake beams are guide feet 36 which are received in slots in the side frame of the truck. Each of the brake heads 30 and brake shoes 32 are adjacent to respective wheel 12, only one of which is illustrated.

Figure 3:
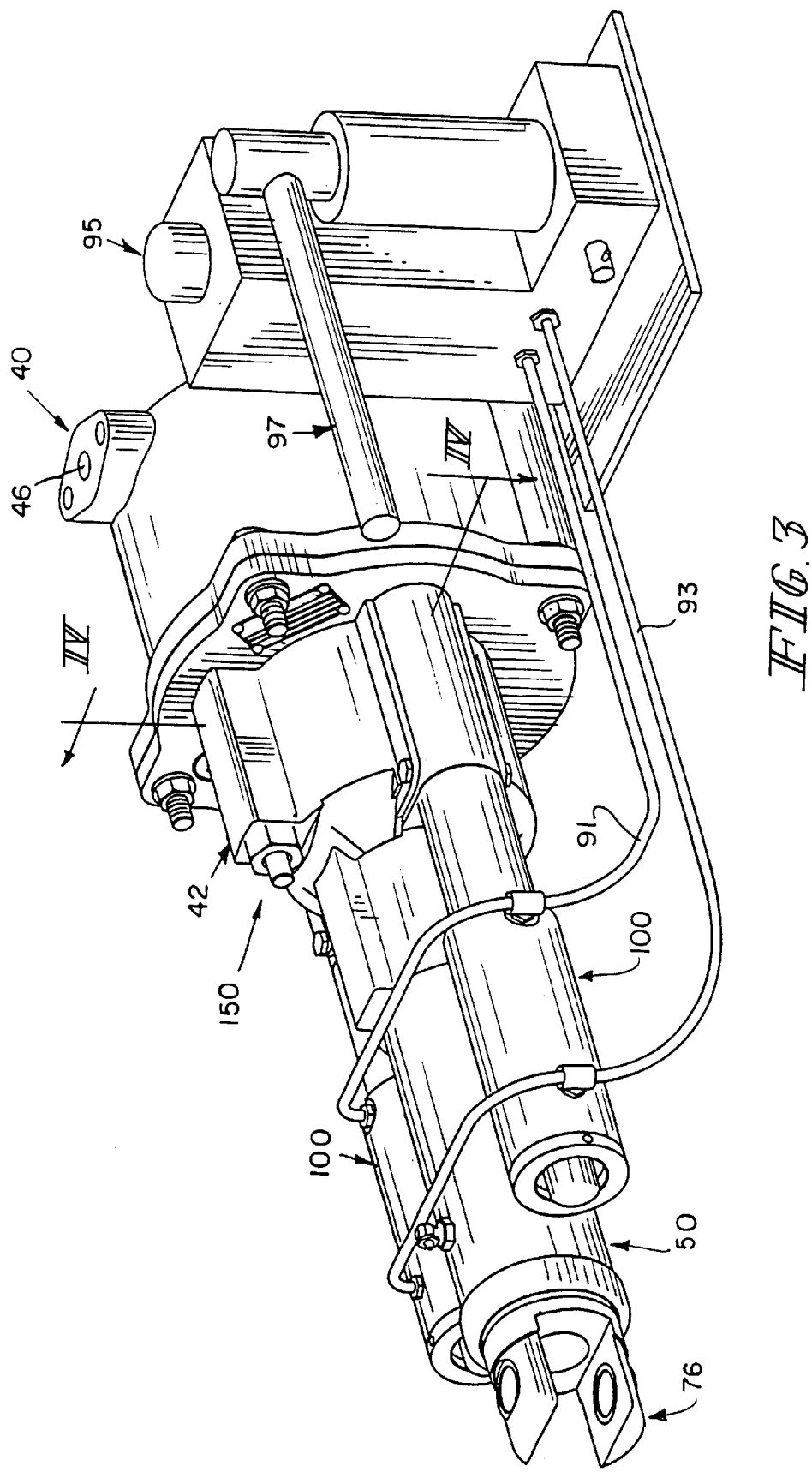
FIG. 3 is a perspective view of a brake actuator incorporating the parking brake of the present invention.
Figure 4:
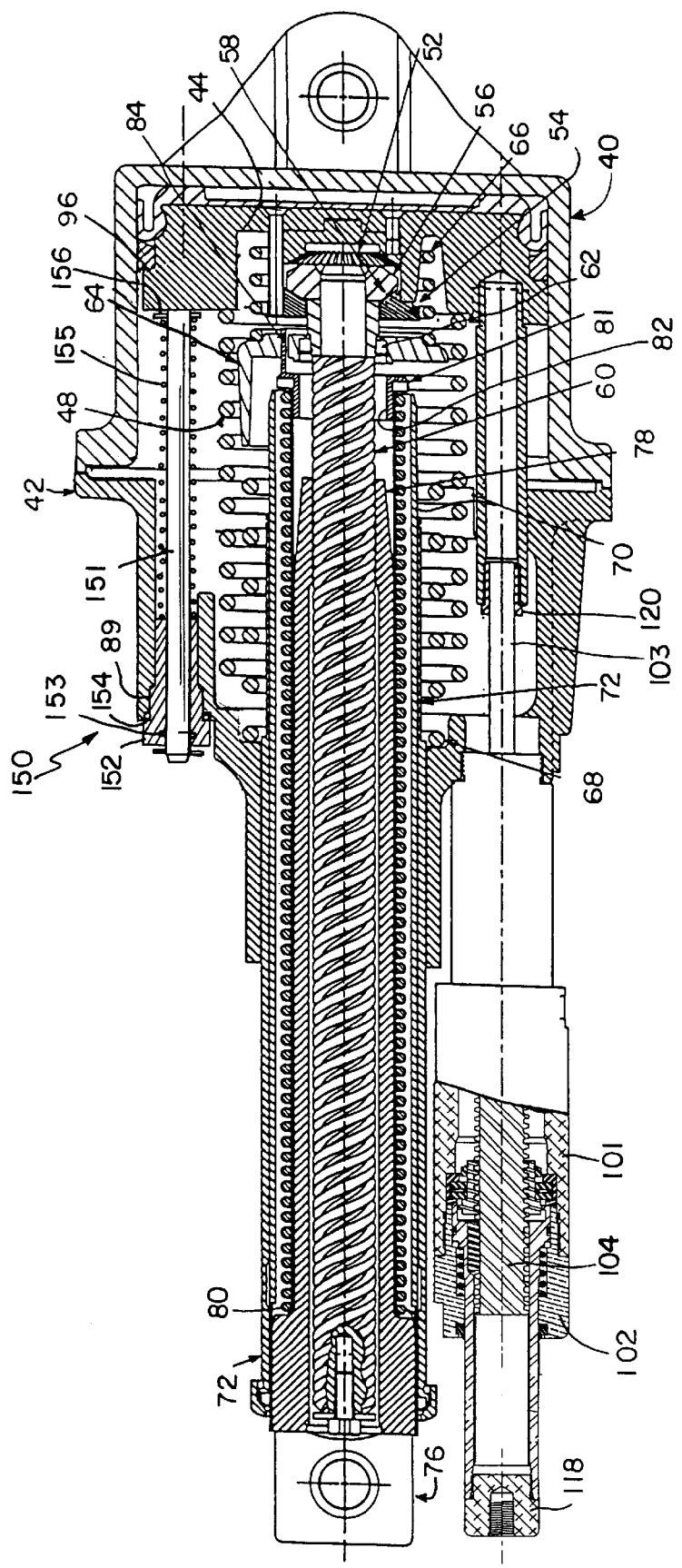
FIG. 4 is a partial cut-away of the brake actuator along line IV—IV of FIG. 3 incorporating the present invention.

As illustrated in FIGS. 2 through 4, the brake cylinder actuator 20 includes a body 40 and non-pressure head 42 to form a housing. Piston 44 divides the interior of body 40 into a pressurized and unpressurized volumes. A port 46 admits the fluid pressure into the volume between the body 40 and the piston 44 to move the piston 44 to the left in brake applied position. Spring return 48 resting at one of its ends on the cylinder portion 42 and biases the piston 44 to the right or release position.

The cylinder slack adjuster portion 50 includes a back female clutch face 52 and a front female clutch face 54 both mounted to the piston 44 cooperating with a corresponding back head clutch face 56 and front head clutch face 58 both part of the compensator screw 60. A bearing 62 rotational mounts the screw 60 to a bearing cup 64. A cup spring 66 rests between the piston 44 and the bearing cup 64 and biases the front clutch faces 54,56 into engagement to prevent rotation of the screw 60. A spring 68 rest between the actuator internal housing portion 42 and a ring 70 on sleeve 72.

A ram 76 is guided inside of sleeve 72 and is threadably connected to the compensation screw 60 at threads 78. A ram spring 80 extends between the ram 76 and a flange 81 on sleeve 82 which engages the piston by follower 84 extending through bearing cup 64 holes. Spring 80 pushes ram 76 leftward when screw 60 rotates during the excessive slack. The slack adjuster 50 is a double acting slack adjuster integral with the actuator 20 or brake cylinder.

A sleeve 86 of the cable 22 is received in opening 88 in the housing portion 42 and is secured thereto by fastener 90. One end of the cable 22 has a termination 92 received in sleeve 94 which is threadably connected to the piston 44 in threaded opening 96. A stop or plug 98 is threadably received in the end of the sleeve 96 and acts as a stop for the termination 92 of the cable 22. Thus, as the cable 22 moves to the left, it pulls the piston 44 to the left or in the applied position. When the parking brake cable 22 is released, the return spring 48 returns the piston 44 to the release position. The termination 92 of the cable 22 may ride freely in sleeve 94 and therefore there is a lost motion in the applied direction of the piston 44.

The system so far described is well known in the industry and is illustrated for example, in U.S. Pat. No. 5,495,921. The operation of the actuator 20, with or without slack adjusters, and the push rod assemblies 18 to operate the pair of brake beams 14 and 16 is well known and will not be described here in detail.

Also, it should be noted that the invention to be described is not to be limited to a specific brake cylinder with or without slack adjuster nor to a brake cylinder system on a truck mounted brake. The description of the invention with a slack adjuster on a truck mounted brake is an example only. The cylinder may be a cylinder on a car which is not truck mounted.

A fluid operated parking brake is illustrated in FIG. 3 as including a pair of fluid actuators or parking brakes 100 mounted to the housing portion 42 of the brake cylinder or actuator 20. A brake cylinder travel indicator 150 is shown and described in detail in FIG. 4. Although two parking brakes 100 are shown for the brake actuator 20, a single parking brake 100 may be used with other brake actuators or brake cylinders. In such a case, the brake cylinder travel indicator 150 would use the connection of the deleted parking brake actuator. The parking brakes 100 are actuated or applied by a fluid received on hoses 91 from a pump 95 and may be released by fluid received on hoses 93 from pump 95. Preferably, the hoses are steel armored hoses. The pump 95 includes an input or manually operated handle 97 which strokes the piston in the pump 95. Other inputs, for example, can be a push piston type. Rotary pumps and various styles of piston pumps may also be used. The pump 95 may be mounted at any location on the rail car with various hose locations to support the preferred mounting location. The pump 95 holds the applied pressure and automatically depressurizes itself. The pump can depressurize itself, for example, within three to ten minutes depending upon the-oil temperature. Pump 95 may be, for example, Model P2A-80 available from Star HYD Pump. This eliminates the need for an external relief valve.

As will be explained with respect to the details of FIGS. 4–7, the parking brake actuators 100 have a locking clutch to lock in the applied position and therefore, pressurization is not needed to maintain the brakes.

In one embodiment of the fluid parking brake 100, the locking clutch is released by a second fluid signal in hose 93. The hose 93 may be connected to a line running throughout the trains such that an engineer at the locomotive or at any of the locations, can release all of the parking brakes simultaneously when the cars are connected into the train. The signal may also be applied on a car-by-car basis at the glad hand which interconnects the pipes between the cars. Similarly, the fluid signal can be applied to hose 93 by any of the various schemes described in U.S. Pat. No. 5,738,416 for controlling the parking brake. As will be explained more fully below, the locking clutch may also be overcome by manual force applied directly to the locking clutch of the fluid actuator 100.

Since the locking clutch is only operational after applying the parking brakes, a fluid pressure signal is not needed to keep the parking brake released.

As shown in FIGS. 4–7, the fluid parking brake 100 includes a body 101 with a cap 102 secured to each other by complementary threaded surfaces. The body 101 and cap 102 form a housing for the parking brake 100. There is an O-ring 126 sealing the threaded connection of the body 101 and the cap 102. Connecting rod 103 extends from the body 101 and is secured to a screw portion 104 of the piston by either a pin or dowel 113 or by a threaded connection between the rod 103 and piston screw 104. A piston head 105 is secured to the piston screw 104 between either a retaining ring 107 or a threaded nut and the threads or shoulder of the piston screw 104. The piston head 105 encompasses and secures the dowel 113 connecting the rod 103 and the piston screw 104. A seal 124 provided on this exterior of the piston head 105 and rides on the interior of body 101. An O-ring 129 is on the interior surface of the piston head 105 which receives the flat of the piston screw 104.

The connecting rod 103 extends through a cap seal 119 and a rod seal 125 positioned in a recess 131 in the body 101. This provides a seal of the internal pressure chamber of the parking brake 100 while allowing the rod 103 to move relative to the body 101. Mounted to the exterior end of rod 103 is a stop 121 threaded on to the rod 103 and retained there by a washer 122 and retaining ring 123. A threaded coupling 120 is threadably received in sleeve 94 of the brake cylinder piston. Coupling 120 is the same as stop plug 98 while stop 121 is the same as termination 92 to form a lost motion device between the brake cylinder piston 44 and the piston 104 of the parking brake 100.

A locking sleeve 115 extends from the other end of the piston screw 104, through wiper 130 and exterior the cap 102. The locking sleeve 115 is coupled to the screw 104 by dowels or pins 116 extending between axial groove 132 in piston screw 104 and an axial recess 133 in sleeve 115. This coupling allows the sleeve 115 to move axially with respect to the screw 104 and prevents rotation therebetween. The exterior end of locking sleeve 115 threadably receives a cap 118 and seal thereto by O-ring 128. The cap 118 includes an interior threaded portion 134 to receive a tool or instrument to be discussed with respect to the manual release of the parking brake 100.

The sleeve 115 includes a head portion 135 which receives an O-ring 127 to seal it with respect to the cap 102. A spring 117 is connected between the head portion 135 of the sleeve 115 and an interior wall of cap 102.

The parking brake 100 includes a locking clutch which includes locking sleeve 115 and a clutch nut 110 threadably received on the piston screw 104. A front face of the head 135 of the sleeve 115 includes a clutch surface 136 illustrated as teeth in FIG. 7. As shown in detail in FIG. 8, the nut 110 includes a head 137 with clutch surface 138 also shown as teeth. A sleeve 106 and washer 114 are retained in a recess 139 between the body 101 and the cap 102 and form therebetween a race 140 for a pair of thrust washers 109 with thrust needle rollers 108 therebetween. The thrust bearings 108 and washers 109 are fixed axially with respect to the body 101 and the cap 102 of the housing. A thrust sleeve 111 is carried on nut 110 and has a limited axial position defined by retaining ring 112 also on nut 110. Alternatively, the thrust sleeve 111 can be threaded onto the nut 110 as shown in FIG. 13, thereby eliminating retaining ring 112. The distance between the thrust sleeve 111 and the head 137 of the nut is greater than the combined thicknesses of the thrust washers 109 and thrust rollers 108. Thus, the nut 110 can move axially with respect to the thrust bearings.

The body 101 includes an apply port 141 to exert or apply pressure to face 142 of the piston head 105. A release port 143 in body 101 produces release pressure on face 144 of piston 105 and on face 145 of the locking sleeve 115.

Figure 5:
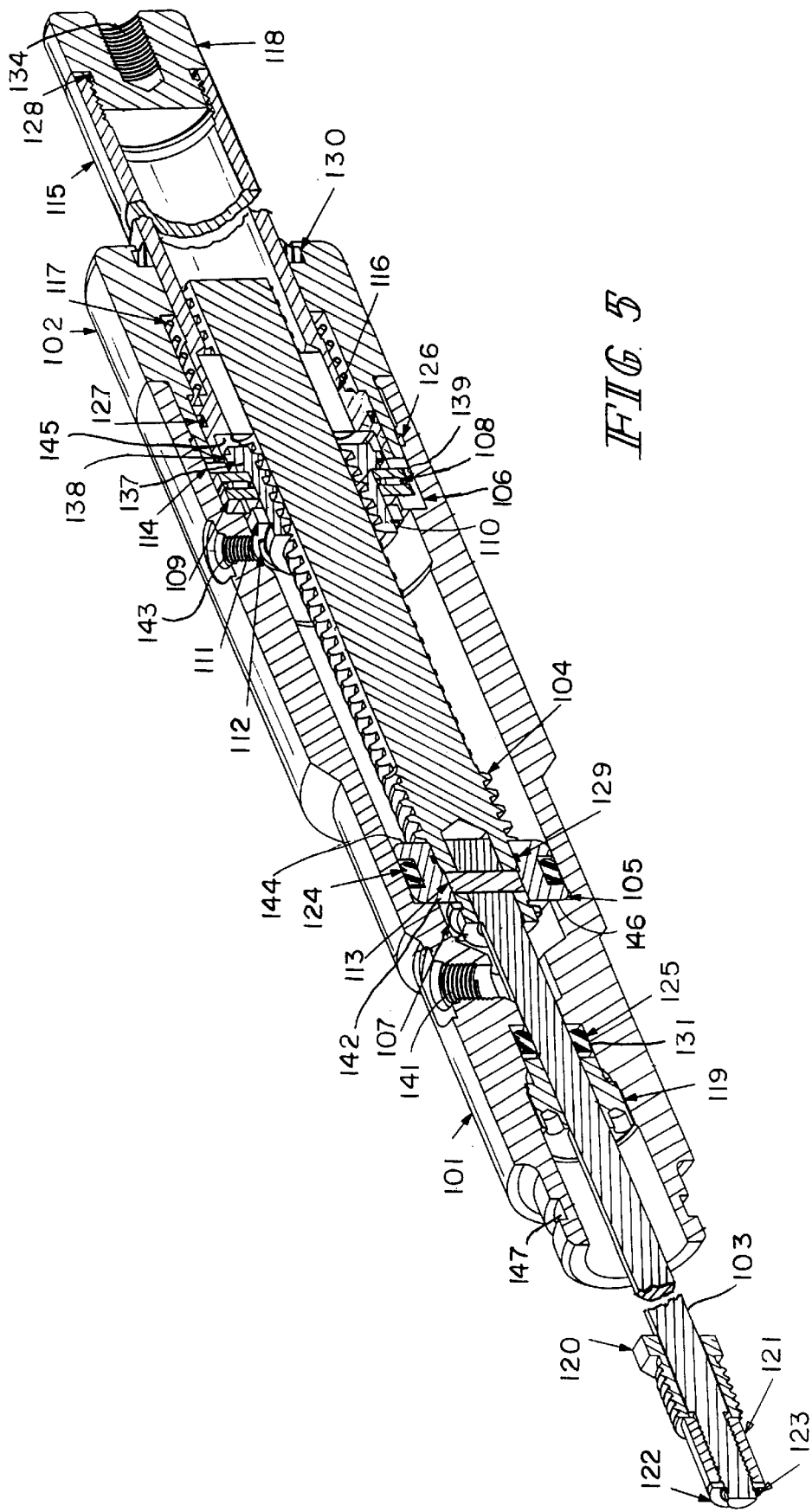
FIG. 5 is an enlarged perspective view of the parking brake of FIG. 4.
Figure 6:
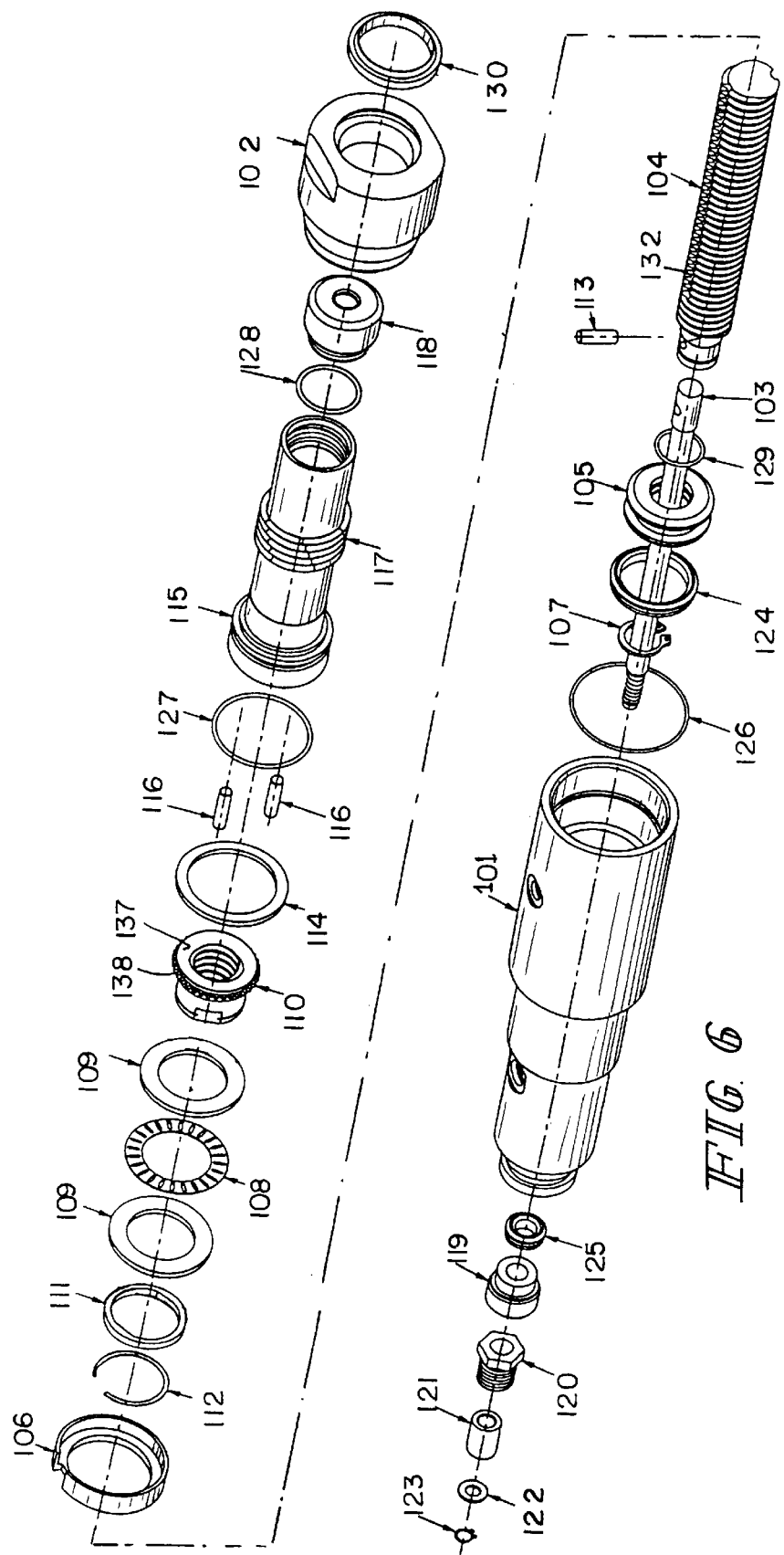
FIG. 6 is an exploded view of the parking brake of FIGS. 4 and 5.
Figure 7:
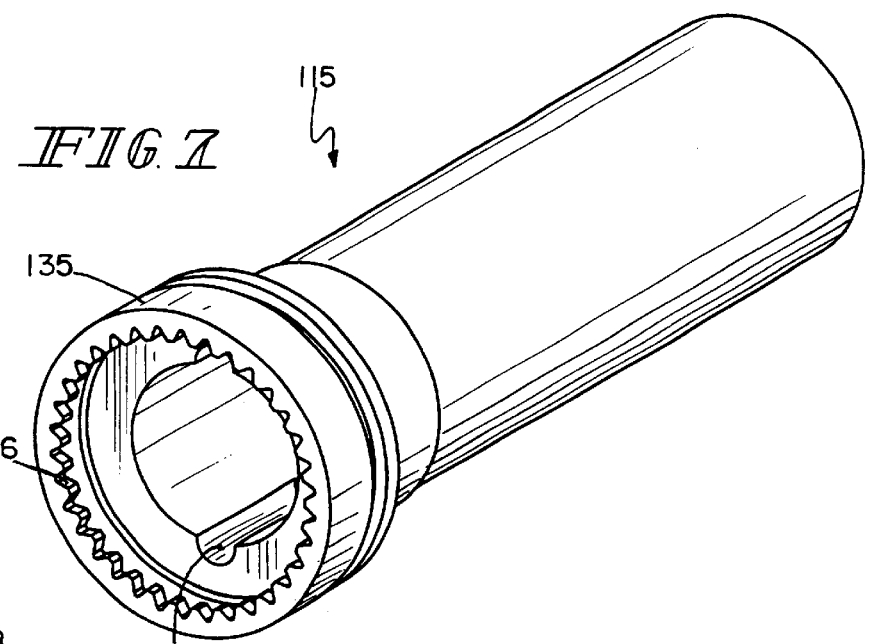
FIG. 7 is a perspective view of a sleeve of a first embodiment of a locking clutch according to the principles of the present invention.
Figure 8:
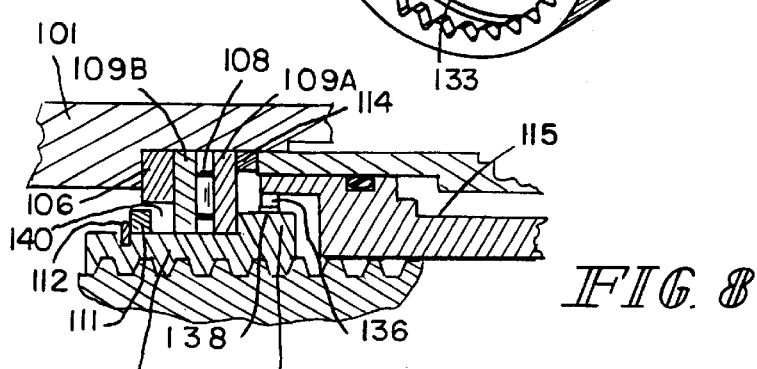
FIG. 8 is a cross-sectional view of the first embodiment for locking clutch in the locked position.

The initial system at rest with the parking brake in the unapplied position is illustrated in FIG. 5. Preferably, the locking clutch is locked as illustrated in FIG. 8. The clutch surfaces 136 and 138 are concentric and engaged. Also, the nut clutch 110 engages the thrust washer 109A. When the pump selector is positioned to the apply position, a fluid is pumped into the apply cylinder port 141 applying fluid pressure to the face 142 of the piston head 105 and the piston screw 104. When the fluid forces overcome all spring and rubber seal friction forces, both the piston screw 104 and the nut clutch 110 begin to extend, moving to the right in the FIGS. 5 and 8–10. Since the piston head 105 is connected by connecting rod 103 to the piston 44 of the brake cylinder, the brake cylinder piston 44 will follow the parking brake piston 105 travel.

Figure 9:
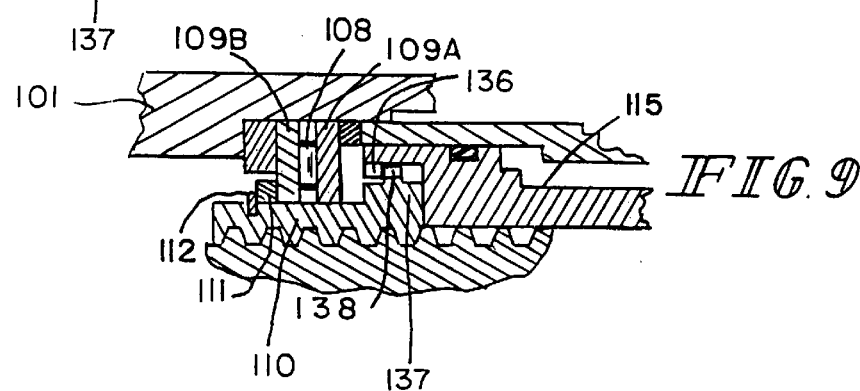
FIG. 9 is a cross-sectional view of the first embodiment of the locking clutch in the unlocked position during parking brake application.

As fluid is continued to be applied to the apply port 141, any fluid on the opposite face 144 of the piston head 105 is displaced out of the release port 143 back to the return side of the pump 95. As the piston screw 104 and nut clutch 110 continue to extend, the locking connection between the nut clutch 110 and the locking sleeve 115 disengage as shown in FIG. 9. Clutch surface 138 on the nut 110 moves to the right relative to the stationary sleeve 115 and clutch surface 136. The spring 117 maintains the sleeve 115 in a relatively fixed position relative to the travel of the screw 104 and nut 110. The nut clutch 110 will continue to extend with the piston screw 104 until the thrust sleeve 111 maintained on the nut 110 engages the thrust washer 109B. As the piston screw 104 continues to extend, the nut clutch 110 will rotate against the thrust washer 109B and needle bearings 108 due to the threaded connection. When a predetermined pressure is obtained, defined by the pump pressure relief setting, extension of the piston screw 104 will stop.

When fluid pressure applied at apply port 141 is released, either by operating the pumps hand valve or through an orifice in the apply pressure line 91, piston screw 104 and nut 110 will begin to retract due to the brake shoe forces. The face of the teeth 138 on nut 110 will then come in contact with the face of the teeth 136 on locking sleeve 115 clutch. Due to the threaded connection between the nut 110 and piston 104, the nut clutch 110 will rotate with respect to the locking sleeve 115 until the locking engagement of the clutch surfaces 136, 138 is achieved. After the locking engagement is made, the nut clutch 110 will continue to retract until contact is made with the thrust washer 109A, as illustrated in FIG. 8. The hydraulic parking brake 100 is now mechanically locked and brake shoe force is maintained.

Figure 10:
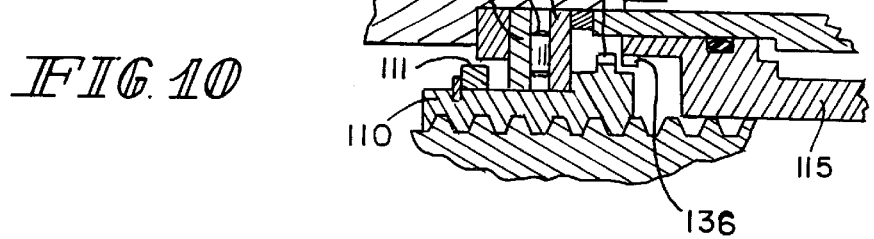
FIG. 10 is a cross-sectional view of the first embodiment of the locking clutch in the unlocked position for releasing the parking brake.

One method of overcoming the locked locking clutch is to apply a release pressure to release port 143. This would be received from the pump 95 via hose 93. The fluid from the release port 143 applies fluid force on face 144 of the piston head 105 and on face 145 of the locking sleeve 115. When the fluid force overcomes the spring 117, the locking sleeve 115 moves to the right to disengage the locking mechanism or clutch surface 136 of the locking sleeve 115 and clutch surface 138 of the locking nut 110. The unlocked position is illustrated in FIG. 10. It should be noted that the relative movement of locking or clutch surfaces 136 and 138 to unlock from a locked position to apply the parking brake in FIG. 9 is opposite the relative direction of movement of the clutch surfaces to unlock to release the parking brake. After the disengagement of the clutch locking surfaces, the nut clutch 110 is. free to rotate.

As fluid forces increase, the piston screw 104 retracts moving to the left in the Figures and the nut clutch 110 engages and rotates against thrust washers 109A and needle bearing 108 due to a threaded connection. Because the two pistons are connected together, the brake cylinder piston 44 will follow the parking brake piston 104 as it travels. As fluid continues to be applied to the release port 143, fluid on the opposite face 142 of piston head 105 is displaced out of the apply port 141 back to the return side of the pump. Once face 142 of the piston head 105 engages the wall 146 of the body 101, retraction of the piston screw 104 and consequently the brake cylinder piston 44 is complete.

When fluid pressure is relieved from the release port 143, the locking sleeve 115 is positioned against the locking nut 110 by spring 117. The clutch surfaces 138 and 136 of the locking nut 110 and the locking sleeve 115, if aligned, can be engaged and locked as illustrated in FIG. 8, or if not aligned, the nut 110 and sleeve 115 will engage each other without the clutch faces 136 and 138 being engaged and locked. If the locking clutch surfaces 136 and 138 are not engaged after the release operation, it will engage and then disengage during the apply operation, previously discussed.

An alternative method of releasing the locked locking clutch is to apply a mechanical force which would overcome the locking clutch. An externally applied unlocking device is threaded into threaded aperture 134 of the sleeve cap 118. Applying pulling force to this device will move locking sleeve 115 to the right in the Figures. This disengages the locking clutch surfaces 136 and 138 which move into the position illustrated in FIG. 10. The force between the brake shoes and the wheel will move the brake cylinder piston 44 and consequently the parking piston 105, 104 to the left. Locking nut 110 will rotate relative to the piston screw 104 until these braking forces are relieved. This will partially release the brakes. To fully release the brakes, fluid pressure must be applied to the release port 143. This returns the piston head 105 to its fully retracted position with the face 142 against wall 146 of the body 101.

The release of the externally applied unlocking device will allow spring 117 to position the locking sleeve 115 against the nut 110. The nut 110 and the locking sleeve 115 can either have their clutching surfaces 138 and 136 respectively either engaged or disengaged due to alignment. If the locking mechanism is not engaged after the release operation, it will engage and disengage during the apply operation.

The release of the externally applied unlocking device will allow spring 117 to position the locking sleeve 115 against the nut 110. The nut 110 and the locking sleeve 115 can either have their clutching surfaces 138 and 136 respectively either engaged or disengaged due to alignment. If the locking mechanism is not engaged after the release operation, it will engage and disengage during the apply operation.

Thus, it can be seen that the locking clutch 110, 115 is responsive to the removal of pressure at the apply port to hold the parking brake piston at the apply position. Other locking clutch structures may be used. Preferably, the locking clutch is applied and locks once the apply pressure is removed.

A second embodiment of the lock and clutch is illustrated in FIG. 11. The nut 110 clutch surface 138 on head 137 is illustrated as a ball bearing 138A in recesses 138B. The clutching surface 136 on the head 135 and sleeve 115 are teeth or splines having an appropriate diameter to receive the geometry of the ball bearings 138A so as to be locked therein. The ball bearings 138A replace the fixed spline teeth 138 of FIGS. 8–10 in the nut 110. The ball bearings 138A will be captured between the bottom of the whole 138B on the nut 110 and the inside diameter of a head 135 of sleeve 115.

The operation of the locking mechanism of FIG. 11 is the same as the fixed spline teeth embodiment of FIGS. 8–10. During the apply operations, the ball bearings 138A are located in the sleeve and displaced from the teeth or splines 136 of the sleeve 115 as illustrated in FIG. 9. When an hydraulic apply pressure is removed, the piston screw 104 is pulled on by the mechanical force produced by the brake shoes, forcing the ball bearings 138A up against the back side of the sleeve teeth 136. The mechanical force tries to rotate the nut 110 through its connection with the piston screw 104. Different from the fixed spline or screw connection of FIGS. 8–10, the ball bearings 138 will rotate against the back side of the teeth 136 of the sleeve 115, allowing the nut 110 to freely rotate the ball bearings 138A to find the opening of the teeth 136 and lock therein. Thus, after the force being applied, as shown in FIG. 9, and relieving of the force, the clutch mechanism will re-engage as shown in FIG. 8.

The release is the same as that shown in FIG. 10 wherein the ball bearings 138 are positioned outside the sleeve 115 and when pressure is released, will rotate against the edge of the teeth 136 and slide into and lock therein as shown in FIG. 8.

A third embodiment of the locking clutch is shown in FIGS. 12 and 13. The clutching surfaces 136 and 138 on locking sleeve 115 and nut clutch 110 are on axially opposed faces of the heads 135, 137 respectively. The clutching surfaces 136 and 138 have fixed half V-shaped teeth that are mere images of each other as shown in FIG. 13. The teeth are designed with a 90° shoulder 148 and a ramp 147. The shoulder 148 is to allow the nut and sleeve teeth to lock up against each other in one direction of rotation. The ramp 147 allows the nut 110 to displace the sleeve 115. The spring 117 returns the sleeve 115 to the teeth 138 on the nut 110 as the teeth clear the end of the tooth and ramp 147 in the other direction of rotation. Another difference from FIGS. 8–10 is that the thrust sleeve 111 is threaded onto the nut 110 so as to engage the plates 109 and needle bearings 108 therebetween. Thus, the nut 110 will only rotate with respect to the piston screw 104. It will not have any axial movement relative thereto. The locking sleeve 115, because of the dowel or pins 116 located in the grooves 132, 133 between the sleeve 115 and the piston screw 104, will move axially and will not rotate with respect to the piston.

As fluid pressure at the apply port 141 increases and the piston screw 104 extends, torque is imposed onto the nut clutch 110 through the thread connection between the nut 110 and piston screw 104. When sufficient input fluid pressure or torque is achieved to overcome friction between the incline surfaces 147 of both the sleeve and nut teeth 136, 138 and spring 117 force, the nut 110 will rotate against the needle bearing 108 and thrust washer 109 displacing the sleeve 115. As the piston screw 104 continues to extend, the nut clutch 110 will continue to rotate. The sleeve 115 will remain in contact with the nut 110 due to the spring force acting on the sleeve. When hydraulic pressure is removed, the piston screw 104 will begin to retract due to the brake shoe forces just applied. The clutch nut 110 will reverse direction and rotate only until shoulder 148 contact is made between the sleeve and nut teeth 136, 138. The hydraulic cylinder is now mechanically locked and brake shoe force is maintained.

When the fluid forces at the release port 143 overcome spring 117, the locking sleeve 115 moves to disengage the locking mechanism between the nut clutch 110 and sleeve 115. After the disengagement of the locking mechanism, the nut clutch 110 is free to rotate. As the fluid force increases, the piston screw 104 retracts and the nut clutch 110 rotates against the thrust washer 109 and needle bearing 108, due to the thread connection. When fluid pressure is relieved, the locking sleeve 115 is positioned against the nut clutch 110 by spring 117.

Since the fluid parking brake 100 is mounted to the housing portions of brake cylinder or actuator device 20 using the openings 88 in the housing and threaded opening 96 in the piston which is used for the cable system, the ability to retrofit cable operated parking brakes is available. Pressure, for example, 10 psi, is applied to the piston 44 causing the piston 44 and sleeve 94 to move to opening 88. This exposes the stop 98 and allows access of a tool to remove stop 98 by a hand tool. The cable termination 92, stop 98 and sleeve 86 can all be removed from the housing portion 42. The connector rod 103 having coupling 120, coupling stop 121, washer 122 and ring 123 are then inserted into the sleeve 94. The coupling 120 is threaded in to the sleeve 94. The cylindrical body 101 of the fluid parking brake 100 is received in opening 88 of brake cylinder housing portion 42 and locked thereto by one or more fasteners 90 extending into recess 147 on the body 101 (FIG. 5). The pressure on piston 44 is removed either after the cylinder body 101 is connected to the brake cylinder housing 42, or just before. As with the cables, a pair of fluid parking brakes are mounted to the piston 44, symmetrical with respect to the applied axis of the piston 44.

The brake travel indicator 150 is illustrated in FIG. 4. It includes a rod 151 extending through a plug 152 which is threadably received in threaded opening 89 of the brake cylinder housing portion 42. O-ring 153 is provided between the rod 151 and the plug 152 and O-ring 154 is provided between the plug 152 and the brake cylinder housing portion 42. A spring 155 extends between the plug 152 and snap ring 156 on rod 151. This biases the rod 151 to ride with the piston 44 of the brake cylinder. A second snap ring 152 is provided on the other end of the rod 151. As the piston 44 moves, the rod 151 follows providing an indication of the position or travel of the piston and consequently, of the brake shoes.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A parking brake for a rail vehicle having a brake cylinder with a first piston in the brake cylinder responsive to fluid signals to apply and release brakes on the vehicle, the parking brake comprises:
    a housing;
    a second piston in the housing and coupled to the first piston;
    an apply port in the housing for receiving a pressure signal to move the second piston to an apply position;
    a locking clutch including a first clutch surface carried by the housing and a second clutch surface carried by the second piston, the clutch surfaces disengage and unlock the second piston in response to the pressure at the apply port and engage and lock the second piston in the applied position in response to removal of pressure at the apply port; and
    wherein the brake cylinder and the first piston have openings for receiving connections of a hand brake and the second piston is connected to the first piston via these openings.

2. A parking brake according to claim 1, including a release port in the housing for receiving a pressure signal to disengage the clutch surfaces and allow the second piston to move to a release position.

3. A parking brake according to claim 1, wherein a portion of the locking clutch which includes the second clutch surface extends exterior to the housing at least in the applied position of the second piston and a manual force on the extended portion disengages the clutch surfaces and allows the second piston to move toward a release position.

4. A parking brake according to claim 1, wherein the first clutch surface is on a sleeve rotationally fixed to the second piston.

5. A parking brake according to claim 4, wherein the second clutch surface is on a nut threadably received on the second piston.

6. A parking brake according to claim 5, wherein the sleeve moves axially on the second piston.

7. A parking brake according to claim 1, wherein the first and second clutch surfaces are concentric when engaged.

8. A parking brake according to claim 7, wherein the first and second clutch surfaces move relative to each other in either direction to disengage.

9. A parking brake according to claim 7, wherein the first and second clutch surfaces move relative to each other in a first direction to disengage when the second piston is in the applied position and move relative to each other in a second direction opposite the first direction to disengage when the second piston is in a released position.

10. A parking brake according to claim 1, wherein the housing is mounted to the brake cylinder.

11. A parking brake according to claim 1, including a manually operated pump connected fluidically to the apply port.

12. A parking brake according to claim 1, wherein the first and second clutch surfaces are axially opposed.

13. A parking brake for a rail vehicle having a brake cylinder with a first piston in the brake cylinder responsive to fluid signals to apply and release brakes on the vehicle, the parking brake comprises:
    a housing;
    a second piston in the housing and coupled to the first piston;
    an apply port in the housing for receiving a pressure signal to move the second piston to an apply position; and,
    a locking clutch including a first clutch surface on a sleeve and a second clutch surface on a nut threadably received on the second piston, the second piston and the sleeve including opposed axial grooves and a pin in the grooves rotationally fixing the sleeve to the second piston and allowing axial movement between the sleeve and the second piston.

14. A parking brake for a rail vehicle having a brake cylinder with a first piston in the brake cylinder responsive to fluid signals to apply and release brakes on the vehicle, the parking brake comprises:
    a housing;
    a second piston in the housing and coupled to the first piston;
    an apply port in the housing for receiving a pressure signal to move the second piston to an apply position;
    a locking clutch including a first clutch surface carried by the housing and a second clutch surface carried by the second piston, wherein the clutch surfaces engage to lock the second piston preventing rotation in a first direction and allowing rotation in an opposite direction relative to one another and the clutch surfaces disengage axially allowing rotation in the first direction; and
    wherein the brake cylinder and the first piston have openings for receiving connections of a hand brake and the second piston is connected to the first piston via these openings.

15. A parking brake for a rail vehicle having a brake cylinder with a first piston in the brake cylinder responsive to fluid signals to apply and release brakes on the vehicle, the parking brake comprises:
    a housing;
    a second piston in the housing and coupled to the first piston;

an apply port in the housing for receiving a pressure signal to move the second piston to an apply position;

a locking clutch including a first clutch surface carried by the housing and a second clutch surface carried by the second piston, the first and second clutch surfaces being concentric when engaged to lock the second piston and moving relative to each other in either direction to disengage and unlock the second piston; and wherein the brake cylinder and the first piston have openings for receiving connections of a hand brake and the second piston is connected to the first piston via these openings.

16. A parking brake according to claim 15, including a release port in the housing for receiving a pressure signal to disengage the clutch surfaces and allow the second piston to move to a release position.

17. A parking brake according to claim 15, wherein a portion of the second piston extend exterior to the housing at least in the applied position and a manual force on the extended portion disengages the clutch surfaces and allows the second piston to move toward a release position.

18. A parking brake according to claim 15, wherein the first clutch surface is on a sleeve rotationally fixed to the second piston.

19. A parking brake according to claim 18, wherein the second clutch surface is on a nut threadably received on the second piston.

20. A parking brake according to claim 19, wherein the sleeve moves axially on the second piston.

21. A parking brake according to claim 20, wherein the second piston and the sleeve include opposed axial grooves and a pin in the grooves.

22. A parking brake according to claim 19, including a thrust bearing between the nut and the housing.

23. A parking brake according to claim 19, including a spring between the sleeve and the housing.

24. A parking brake according to claim 15, wherein the first and second clutch surfaces move relative to each other in a first direction to disengage when the second piston is in the applied position and move relative to each other in a second direction opposite the first direction to disengage when the second piston is in a released position.

25. A parking brake according to claim 15, wherein the second piston is coupled to the first piston by a lost motion device.

26. A parking brake according to claim 15, wherein the first and second clutch surfaces are fixed teeth.

27. A parking brake according to claim 15, wherein one of the clutch surfaces are fixed teeth and the other clutch surface includes a plurality of ball bearings in pockets.

* * * * *